United States Patent [19]

Masia et al.

[11] Patent Number: 5,235,286

[45] Date of Patent: Aug. 10, 1993

[54] METHOD FOR DETECTING AND OBTAINING INFORMATION ABOUT CHANGERS IN VARIABLES

[75] Inventors: Michael Masia, Redwood City; James P. Reed, San Francisco; Robert S. Wasley, San Carlos; Paul D. Hauptly, Fremont; Larry R. Reeder, San Jose; Peter L. Brooks, Los Altos; Thomas W. Tolles, San Francisco; Louis M. Frank, Sunnyvale; Mauro Bonomi, Palo Alto; Ray F. Stewart, Redwood City; John Lahlough, San Jose; Lawrence Welsh, Palo Alto, all of Calif.

[73] Assignee: Raychem Corporation, Menlo Park, Calif.

[21] Appl. No.: 698,012

[22] Filed: May 9, 1991

Related U.S. Application Data

[63] Continuation of Ser. No. 372,179, Jun. 27, 1989, Pat. No. 5,015,958, which is a continuation of Ser. No. 306,237, Feb. 2, 1989, abandoned, which is a continuation of Ser. No. 832,562, Feb. 20, 1986, abandoned, which is a continuation-in-part of Ser. No. 599,047, Apr. 11, 1984, abandoned, which is a continuation-in-part of Ser. No. 509,897, Jun. 30, 1983, abandoned, said Ser. No. 832,562, is a continuation-in-part of Ser. No. 556,740, Nov. 30, 1983, abandoned, and a continuation-in-part of Ser. No. 556,829, Dec. 1, 1983, abandoned, which is a continuation-in-part of Ser. No. 556,740, Nov. 30, 1983, abandoned, said Ser. No. 832,562, is a continuation-in-part of Ser. No. 618,109, Jun. 7, 1984, abandoned, and a continuation-in-part of Ser. No. 618,108, Jun. 7, 1984, abandoned, which is a continuation-in-part of Ser. No. 603,485, Apr. 29, 1984, abandoned, said Ser. No. 832,562, is a continuation-in-part of Ser. No. 603,484, Apr. 24, 1984, abandoned, and a continuation-in-part of Ser. No. 744,170, Jun. 12, 1985, abandoned, and a continuation-in-part of Ser. No. 787,278, Oct. 15, 1985, abandoned, which is a continuation-in-part of Ser. No. 744,170, Jun. 12, 1985, abandoned, and a continuation-in-part of Ser. No. 838,725, Mar. 11, 1986, Pat. No. 4,926,165.

[51] Int. Cl.[5] .......................... G01R 31/08; H01B 7/32

[52] U.S. Cl. .................................. 324/522; 324/525; 324/526; 174/11 R

[58] Field of Search ................ 324/522, 509, 512, 523, 324/529, 526, 539, 551, 691; 379/26; 340/603–605, 677; 174/11 R

[56] References Cited

U.S. PATENT DOCUMENTS 1,084,910 1/1914 Stephenson .
1,648,197 11/1927 Roadhouse .
1,772,232 8/1930 Van Guilder .

(List continued on next page.)

FOREIGN PATENT DOCUMENTS 58704 4/1913 Austria .
719311 10/1965 Canada ............................ 200/61.04

(List continued on next page.)

OTHER PUBLICATIONS

"Water Sentry Leak Sentry Distributed Alarm and Locator Systems", Raychem Corporation, Jan. 1984.
Stubbings, "Electrical Review", Dec. 28, 1945, p. 947.
Data Aquisition Handbook, Dec. 1982.

Primary Examiner—Kenneth A. Wieder
Assistant Examiner—Mura Regan
Attorney, Agent, or Firm—Timothy H. P. Richardson; Herbert G. Burkard

[57] ABSTRACT

An elongate sensor for detecting and locating presence of a liquid, e.g. water or a hydrocarbon. The sensor includes first and second elongate members which are spaced apart from each other and each of which is a metal conductor covered by a conductive polymer; a third, insulated elongate conductor; and an elongate insulating core. At least one of the elongate members is helically wrapped around the core. Presence of the liquid at any point along the length of the sensor causes the first and second members to be electrically connected at that point, creating a system in which the potential drop down one of the members can be measured and the location of the connection determined.

12 Claims, 5 Drawing Sheets

U.S. PATENT DOCUMENTS

| | | | |
|---|---|---|---|
| 1,786,843 | 12/1930 | Hedeby | 200/193 |
| 2,004,569 | 6/1935 | Davis, Jr. | 175/183 |
| 2,360,434 | 10/1944 | Manning | 200/61.05 |
| 2,432,367 | 9/1943 | Andresen | 200/52 |
| 2,563,341 | 8/1951 | Kettering | 200/61.05 |
| 2,581,213 | 1/1952 | Spooner | 177/311 |
| 2,691,134 | 10/1954 | Ford | 324/65 |
| 2,716,229 | 8/1955 | Wehrmann | 340/605 |
| 2,741,591 | 4/1956 | Dewey, II et al. | 204/180 |
| 2,759,175 | 8/1956 | Spalding | 340/242 |
| 2,790,146 | 4/1957 | Livingston | 324/140 |
| 2,841,765 | 7/1958 | Harrold | 324/62 |
| 2,879,471 | 3/1959 | Erath | 324/62 |
| 2,881,392 | 4/1959 | Heinz | 324/98 |
| 2,930,232 | 3/1960 | Spears | 73/304 R |
| 2,976,486 | 3/1961 | Gilbert | 324/64 |
| 3,033,916 | 6/1958 | Scofield | 174/117 |
| 3,045,198 | 7/1962 | Dolan et al. | 338/13 |
| 3,098,116 | 7/1963 | Jore | 200/61.04 |
| 3,127,485 | 3/1964 | Vitolo | 200/61.05 |
| 3,200,388 | 8/1965 | Uhlig | 340/242 |
| 3,248,646 | 4/1966 | Brazee | 324/52 |
| 3,254,334 | 5/1966 | Mitchell | 340/514 |
| 3,304,612 | 2/1967 | Proctor | 178/18 |
| 3,365,661 | 1/1968 | Zimmerman | 324/52 |
| 3,382,493 | 5/1968 | Loper, Jr. et al. | 340/244 |
| 3,383,863 | 5/1968 | Berry | 61/1 |
| 3,427,414 | 2/1969 | Sheldahl | 200/61.04 |
| 3,465,109 | 9/1969 | Williams | 200/61.04 |
| 3,470,340 | 9/1969 | Hakka | 200/61.04 |
| 3,520,476 | 7/1970 | Schmid | 200/61.04 |
| 3,550,120 | 12/1970 | Kompelien | 340/409 |
| 3,564,526 | 2/1971 | Butts | 200/61.04 |
| 3,588,776 | 6/1971 | Horwinski | 340/508 |
| 3,600,674 | 8/1971 | Brea | 324/52 |
| 3,662,367 | 5/1972 | Deveau | 174/11 R |
| 3,702,473 | 11/1972 | Fink | 340/511 |
| 3,706,927 | 12/1972 | Jedvall | 324/52 |
| 3,721,898 | 3/1973 | Dragoumis et al. | 324/65 |
| 3,800,216 | 3/1974 | Hamilton | 324/52 |
| 3,800,217 | 3/1974 | Lowrence | 324/54 |
| 3,812,420 | 5/1974 | Gunter | 324/52 |
| 3,849,723 | 11/1974 | Allen | 324/446 |
| 3,852,995 | 12/1976 | Duncanson | 73/40 |
| 3,866,202 | 2/1975 | Reiss et al. | 340/274 |
| 3,875,331 | 4/1975 | Hasenbalg | 178/18 |
| 3,885,097 | 5/1975 | Pobgee | 178/18 |
| 3,970,863 | 7/1976 | Kishikawa et al. | 307/116 |
| 3,981,181 | 12/1976 | Ochiai | 73/40.5 |
| 3,991,413 | 11/1986 | Berger | 340/677 X |
| 4,013,924 | 3/1977 | Christensen | 174/11 R |
| 4,023,412 | 5/1977 | Luke et al. | 73/40.5 R |
| 4,029,889 | 6/1977 | Mizuochi | 174/11 |
| 4,052,901 | 10/1977 | Bjork | 73/304 R |
| 4,095,174 | 6/1978 | Ishido | 324/52 |
| 4,125,822 | 11/1978 | Perren et al. | 338/34 |
| 4,129,030 | 12/1978 | Dolan | 73/23 |
| 4,184,143 | 1/1980 | Stafford | 367/13 |
| 4,193,068 | 3/1980 | Ziccardi | 200/61.04 |
| 4,206,632 | 6/1980 | Suzuki | 340/605 |
| 4,224,595 | 9/1980 | Dolan | 338/34 |
| 4,237,721 | 12/1980 | Dolan | 73/23 |
| 4,246,575 | 1/1981 | Purtell | 340/605 |
| 4,263,115 | 4/1981 | Kessler | 204/418 |
| 4,278,931 | 7/1981 | Huggins | 324/52 |
| 4,288,653 | 9/1981 | Blom et al. | 174/47 |
| 4,288,654 | 9/1981 | Blom et al. | 174/47 |
| 4,297,686 | 10/1981 | Tom | 340/604 |
| 4,298,969 | 11/1981 | Rickenbacker | 367/13 |
| 4,305,321 | 12/1981 | Cohn | 84/1.24 |
| 4,307,606 | 12/1981 | Johnson | 73/295 |
| 4,319,078 | 3/1982 | Yokoo | 178/18 |
| 4,319,184 | 3/1982 | Kowalczyk | 333/81 R |
| 4,319,232 | 3/1982 | Westphal et al. | 340/604 |
| 4,359,721 | 11/1982 | Galvin et al. | 340/525 |
| 4,369,436 | 1/1983 | Lautzenheiser | 340/510 |
| 4,374,379 | 2/1983 | Dennison, Jr. | 200/61.05 |
| 4,386,231 | 5/1983 | Vokey | 174/115 |
| 4,400,663 | 8/1983 | May | 379/26 X |
| 4,404,516 | 9/1983 | Johnson | 340/605 |
| 4,414,441 | 11/1983 | Perry et al. | 200/61.04 |
| 4,423,410 | 12/1983 | Galvin et al. | 340/525 |
| 4,424,479 | 1/1984 | Brown | 324/52 |
| 4,445,012 | 4/1984 | Blackburn et al. | 200/61.04 |
| 4,446,421 | 5/1984 | Berde | 324/52 |
| 4,449,098 | 5/1984 | Nakamura et al. | 138/104 |
| 4,467,286 | 8/1984 | Stitt | 333/81 R |
| 4,468,306 | 8/1984 | Freeman et al. | 204/180 |
| 4,468,607 | 8/1984 | Tanaka | 333/81 R |
| 4,503,526 | 3/1985 | Beauducel | 367/13 |
| 4,537,668 | 8/1985 | Gaussens et al. | 204/159.17 |
| 4,553,432 | 11/1985 | Barlian | 338/35 |
| 4,563,674 | 1/1986 | Kobayashi | 340/605 |
| 4,570,477 | 2/1986 | Sugibuchi | 174/11 R |
| 4,571,292 | 2/1986 | Liu | 204/412 |
| 4,594,638 | 1/1986 | Suzuki | 174/11 R |
| 4,631,952 | 12/1986 | Donaghey | 338/34 |
| 4,677,371 | 6/1987 | Imaizumi | 174/11 R |
| 5,015,958 | 5/1991 | Masia et al. | 324/522 |

FOREIGN PATENT DOCUMENTS

| | | | |
|---|---|---|---|
| 028142 | 5/1981 | European Pat. Off. | |
| 056283 | 1/1982 | European Pat. Off. | |
| 067679 | 12/1982 | European Pat. Off. | |
| 068767 | 1/1983 | European Pat. Off. | |
| 087307 | 8/1983 | European Pat. Off. | |
| 684427 | 11/1939 | Fed. Rep. of Germany | 73/40.5 R |
| 899978 | 7/1949 | Fed. Rep. of Germany | 324/526 |
| 1210057 | 2/1966 | Fed. Rep. of Germany | 200/61.04 |
| 1297682 | 6/1969 | Fed. Rep. of Germany | |
| 2135214 | 2/1973 | Fed. Rep. of Germany | 333/81 R |
| 2413996 | 12/1974 | Fed. Rep. of Germany | |
| 2455007 | 5/1976 | Fed. Rep. of Germany | |
| 2517769 | 10/1976 | Fed. Rep. of Germany | |
| 2911703 | 3/1979 | Fed. Rep. of Germany | |
| 2807084 | 8/1979 | Fed. Rep. of Germany | |
| 3011500 | 10/1981 | Fed. Rep. of Germany | |
| 3225742 | 2/1983 | Fed. Rep. of Germany | |
| 3140804 | 4/1983 | Fed. Rep. of Germany | |
| 3239133 | 6/1983 | Fed. Rep. of Germany | |
| 3209560 | 9/1983 | Fed. Rep. of Germany | |
| 3441924 | 5/1985 | Fed. Rep. of Germany | 73/40.5 R |
| 1260189 | 3/1961 | France | |
| 566133A | 1/1981 | Japan | |
| 133370 | 8/1982 | Japan | |
| 94185 | 5/1984 | Japan | 178/18 |
| 112266 | 6/1985 | Japan | |
| 0013472 | 1/1989 | Japan | 324/522 |
| 28531 | 12/1932 | Netherlands | 324/522 |
| WO8301138 | 3/1983 | PCT Int'l Appl. | |
| 678646 | 8/1979 | U.S.S.R. | |
| 0728097 | 4/1980 | U.S.S.R. | 324/522 |
| 182339 | 7/1922 | United Kingdom | |
| 547461 | 8/1942 | United Kingdom | |
| 561523 | 5/1944 | United Kingdom | |
| 591822 | 8/1947 | United Kingdom | 73/40.5 R |
| 646392 | 11/1950 | United Kingdom | |
| 919517 | 2/1963 | United Kingdom | |
| 939049 | 10/1963 | United Kingdom | 200/61.04 |
| 1178231 | 1/1970 | United Kingdom | |
| 1352124 | 5/1974 | United Kingdom | |
| 1355176 | 6/1974 | United Kingdom | 73/40.5 R |
| 1401146 | 7/1975 | United Kingdom | |
| 1470503 | 4/1977 | United Kingdom | |
| 1481850 | 8/1977 | United Kingdom | |
| 1550550 | 8/1979 | United Kingdom | |
| 2043974 | 10/1980 | United Kingdom | |
| 2077471 | 12/1981 | United Kingdom | |
| 2091880 | 8/04/82 | United Kingdom | |

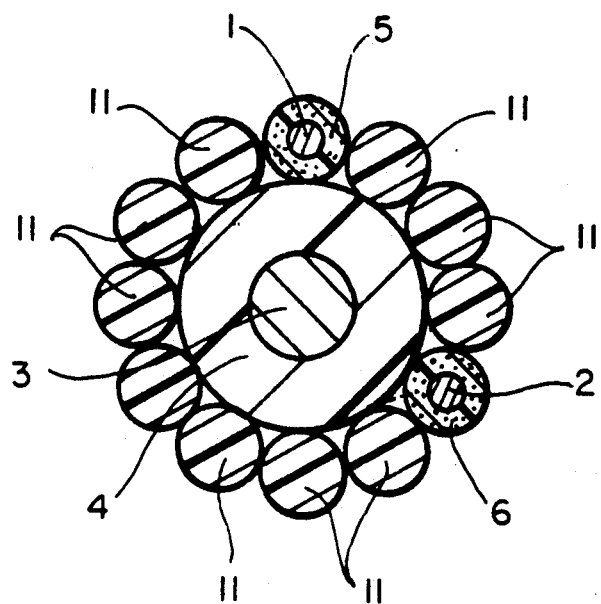
FIG_1
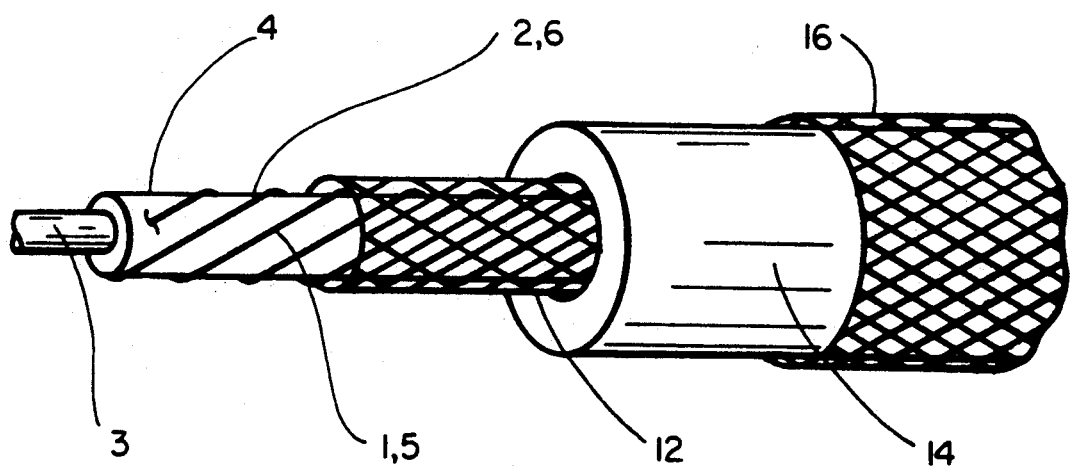
FIG_2

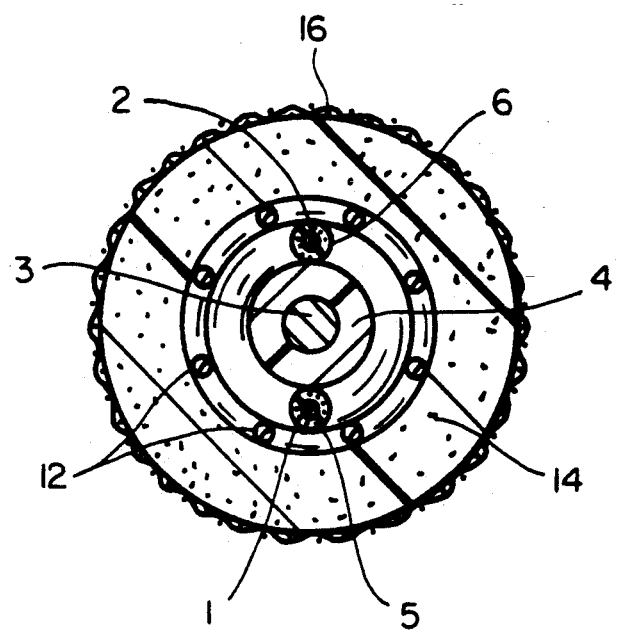
FIG_3
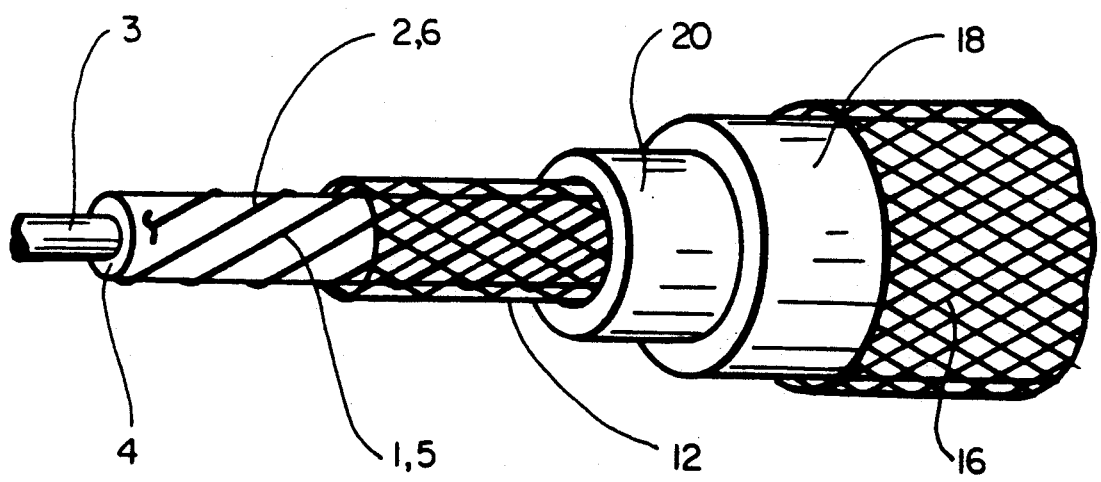
FIG_5

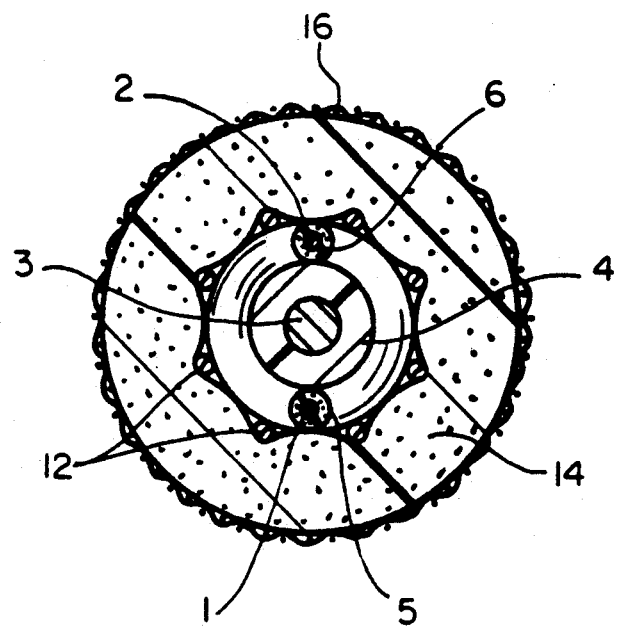
FIG_4
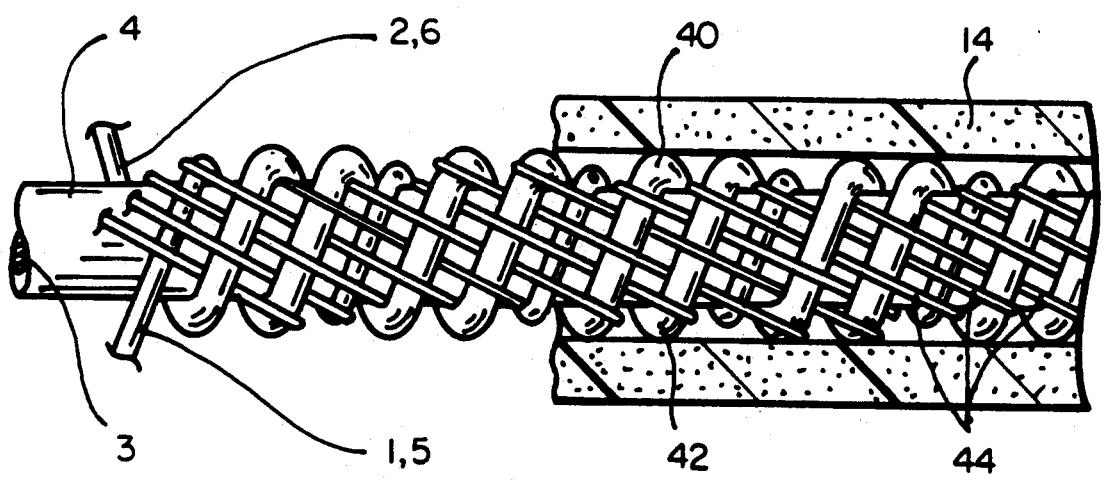
FIG_6

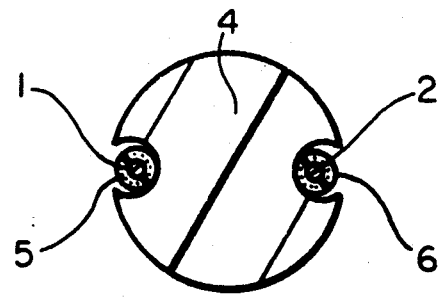
FIG_7
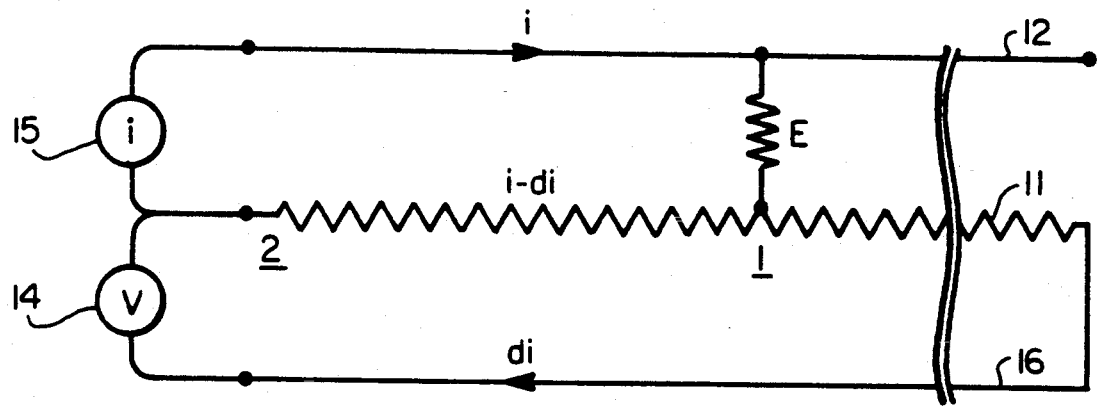
FIG_8
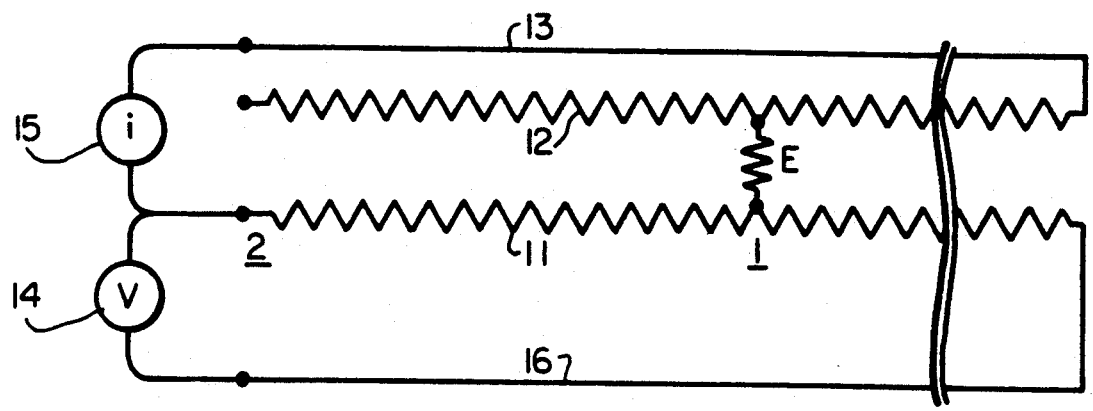
FIG_9

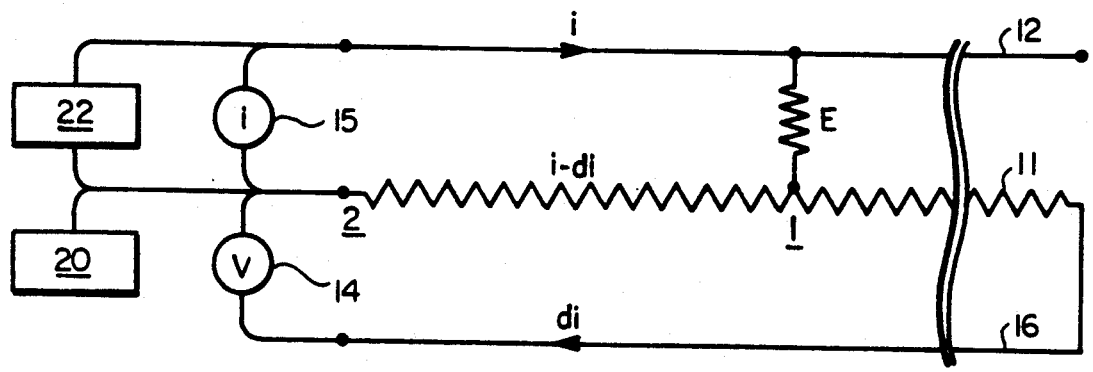
FIG_10
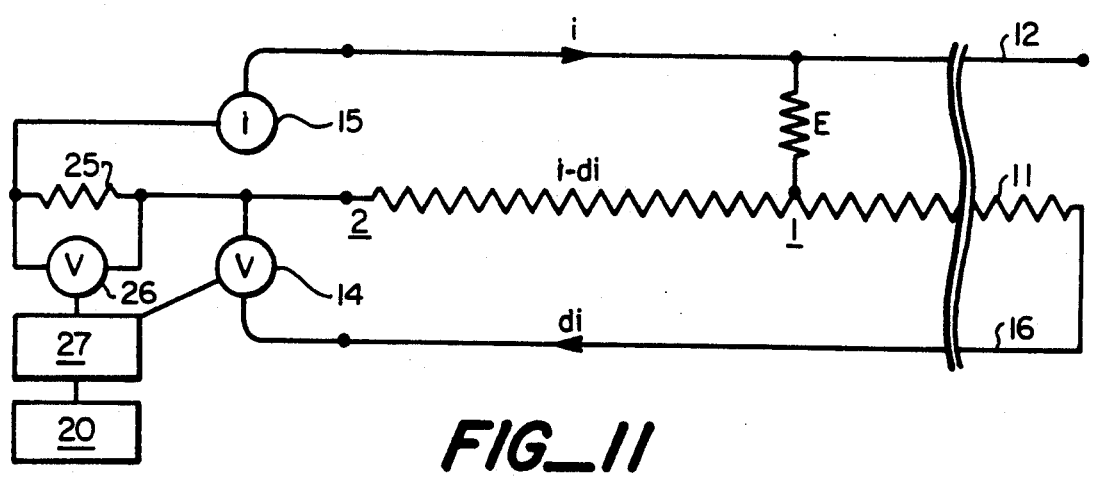
FIG_11 ns. 5,235,286

METHOD FOR DETECTING AND OBTAINING INFORMATION ABOUT CHANGERS IN VARIABLES

CROSS-REFERENCE TO RELATED APPLICATIONS

This application is a continuation of Ser. No. 372,179 filed Jun. 27, 1989, now U.S. Pat. No. 5,015,958, which is a continuation of Ser. No. 306,237, filed Feb. 2, 1989, now abandoned, which is a continuation of Ser. No. 832,562 filed Feb. 20, 1986, now abandoned, which is a continuation-in-part of each of the following commonly assigned applications:
(1) Ser. No. 599,047 filed Apr. 11, 1984, by Masia and Reed, now abandoned, which is a continuation-in-part of Ser. No. 509,897, filed Jun. 30, 1983, by Masia and Reed, now abandoned;
(2) Ser. No. 556,740, filed Nov. 30, 1983, by Wasley, now abandoned;
(3) Ser. No. 556,829, filed Dec. 1, 1983, by Wasley, now abandoned, which is a continuation-in-part of Ser. No. 556,740, now abandoned;
(4) Ser. No. 618,109, filed Jun. 7, 1984, by Reeder, now abandoned;
(5) Ser. No. 618,108, filed Jun. 7, 1984, by Brooks and Tolles, now abandoned, which is a continuation-in-part of Ser. No. 603,485, filed Apr. 24, 1984, by Brooks and Tolles, now abandoned;
(6) Ser. No. 603,484, filed Apr. 24, 1984, by Frank and Bonomi, now abandoned;
(7) Ser. No. 744,170, filed Jun. 12, 1985, by Stewart, Lahlouh and Wasley, now abandoned; and
(8) Ser. No. 787,278, filed Oct. 15, 1985, by Stewart, Lahlouh, Wasley, Hauptly and Welsh, which is a continuation-in-part of Ser. No. 744,170, and which is now abandoned in favor of continuation-in-part Ser. No. 838,725, filed Mar. 11, 1986 now U.S. Pat. No. 4,926,165.
The disclosure of each of the patents and applications referred to above is incorporated herein by reference.

BACKGROUND OF THE INVENTION

1. Field of the Invention

This invention relates to methods and apparatus for detecting and locating the presence of liquids.

2. Introduction to the Invention

A number of methods have been used (or proposed for use) to detect a liquid leak. Many of these methods make use of two detector members which are insulated from each other in the absence of the liquid but which become electrically connected when the liquid is present. When the liquid to be detected is water or another electrolyte, the detector members may be wires which are continuously or intermittently exposed, so that when an electrolyte is present, the detector members are electrically connected to each other through the electrolyte—see for example U.S. Pat. No. 3,098,116 (Jore et al), especially FIGS. 2 and 3, and U.S. Pat. No. 4,319,232 (Westphal et al), especially FIGS. 2, 3, and 4. When the liquid to be detected is a hydrocarbon, the sensor may comprise a member which swells when it is contacted by the hydrocarbon and which thus causes the detector members to become electrically connected—see for example U.S. Pat. No. 3,470,340 (Hakka). Some of the known methods make use of elongate sensors which not only signal when the leak takes place, but also indicate the location of the leak. For this purpose, the sensor may include a third, fully insulated wire which can form part of an electrical bridge circuit including the leak connection—see for example U.S. Pat. No. 3,365,661 (Zimmerman), especially FIGS. 2 and 3.

SUMMARY OF THE INVENTION

This invention relates to sensors in which each of the detector members is a metal core surrounded by a conductive polymer, and in which one or more of the electrically operative elements of the sensor are wrapped around an insulating core. The invention also relates to improved electrical systems for use in the detection and location of liquid leaks.

In its first aspect, this invention provides an elongate sensor for use in a method for detecting and locating the presence of a liquid, the sensor comprising
(1) a first elongate electrical connection means (often referred to herein as the source member)
  (i) which has a near end and a far end; and
  (ii) which comprises an elongate metal core electrically surrounded by a jacket of a conductive polymer composition which comprises a polymeric component and, dispersed in the polymeric component, a sufficient amount of a particulate conductive filler to render the composition conductive at ambient temperature;
(2) a second elongate electrical connection means (often referred to herein as the locating member)
  (i) which has a near end adjacent the near end of the first connection means and a far end adjacent the far end of the first connection means,
  (ii) which comprises an elongate metal core electrically surrounded by a jacket of a conductive polymer composition which comprises a polymeric component and, dispersed in the polymeric component, a sufficient amount of a particulate conductive filler to render the composition conductive at ambient temperature;
  (iii) whose resistance, from the near end to each point thereon, is characteristic of its length from the near end to that point, and
  (iv) which is electrically insulated from the first connection means between its near end and its far end in the absence of the liquid and which, in the presence of the liquid, becomes electrically connected to the first connection means, the connection being effective at a first point whose location is defined by the location of the point or points at which the liquid is present;
(3) a third elongate electrical connection means (often referred to herein as the return member)
  (i) which has a near end adjacent the near ends of the first and second connection means and a far end adjacent the far ends of the first and second connection means, and
  (ii) which is a wire which is electrically insulated from said first and second electrical connection means between its near end and its far end in the absence of the fluid and in the presence of the fluid; and
(4) an elongate insulating core;
the first, second and third connection means being physically secured together; and at least one of the first, second and third connection means being spirally wrapped around the core at a constant pitch. The insulating core can be provided by insulation surrounding the third elongate electrical connection means or by a separate member.

In its second aspect, this invention provides a method for detecting and locating the presence of a liquid, particularly an electrolyte, which method comprises
(A) providing a system
   (a) which comprises
      a power source;
      a voltage-measuring device; and
      an elongate sensor as defined above, and
   (b) in which system, when the fluid to be detected is present,
   electrical connection is made between the first connection means and the second connection means through said conductive polymer composition;
   the connection to the second connection means being effective at a first point whose location is defined by the location of the point or points at which the liquid is present;
   the making of the connection resulting in the formation of a test circuit which comprises (i) that part of the second connection means which lies between the first point and a second point at the near end of the second connection means, (ii) the connection, and (iii) the power source, the power source causing an electrical current of known size to be transmitted between the first and second points on the second connection means; and
   the current and the second connection means being such that, by measuring the voltage drop between the first and second points, the spatial relationship between the first and second points can be determined;
(B) monitoring the system continuously or on a schedule to determine when a said connection has been made, said test circuit being in existence while said monitoring is taking place if a said connection has been made;
(C) when it is determined that a said connection has been made, using the voltage-measuring device to determine the voltage drop between the first and second points; and
(D) obtaining the location of the first point from the measurement made in step (C).

BRIEF DESCRIPTION OF THE DRAWING

The invention is illustrated in the accompanying drawing, in which

FIGS. 1-7 are diagrammatic illustrations of sensors of the invention, and

FIGS. 8-11 are circuit diagrams illustrating the methods of the invention.

DETAILED DESCRIPTION OF THE INVENTION

In describing the invention, the first connection means is often referred to as the source member (since it is, in use, connected to the power source); the second connection means is often referred to as the locating member (since the voltage drop between the first and second points thereon is used to calculate the location of the leak); and the third connection means is often referred to as the return member (since it provides a return leg in the circuit created by the leak connection).

Each of the source, locating and return members is elongate, this term being used herein to denote a member having a length which is substantially greater, e.g. at least 100 times greater, often at least 1,000 times greater, sometimes at least 10,000 greater or even at least 100,000 times greater, than either of its other dimensions.

In many cases, it is convenient for one, two or all three of the locating, return and source members to comprise simple conductors which are of constant cross-section and which have resistance but no reactance. The locating, return and source members can be the same or different, but it is convenient, for making splices between sensors at intermediate points, if the locating and source members are identical.

The locating member preferably has an impedance such that the voltage drop between the first and second points is sufficiently high to be easily and accurately measured, but not so high as to require a large power source. Preferably, therefore, it has a resistance of at least 0.1 ohm/ft, particularly at least 1 ohm/ft, but less than 20 ohm/foot, e.g. 1 to 5 ohm/foot. So that the accuracy of the results is not adversely affected by changes in the ambient temperature, the metal in the core of the locating member is preferably one having a temperature coefficient resistivity of less than 0.003, particularly less than 0.0003, especially less than 0.00003, per degree Centigrade over the temperature range 0° to 100° C., for example Constantan (also known as Eureka), Manganin or Copel.

Each of the locating the source members comprises an elongate metal core which is electrically surrounded by a conductive polymer. The conductive polymer jacket helps these members to withstand the stresses on them during installation and use, even when the metal core is a wire of relatively small cross-section. The term "electrically surrounds" is used herein to mean that all electrical paths to the metal core (intermediate the ends thereof) pass through the jacket. Normally the conductive polymer will completely surround the core, being applied for example by a melt-extrusion process; however, it is also possible to make use of a jacket which has alternate insulating sections and conductive sections. The conductive polymer not only provides physical strength but also prevents corrosion of the metal core.

The term "conductive polymer" is used herein to denote a composition which comprises a polymeric component (e.g. a thermoplastic or an elastomer or a mixture of two or more such polymers) and, dispersed in the polymeric component, a particulate conductive filler (e.g. carbon black, graphite, a metal powder or two or more of these). Conductive polymers are well known and are described, together with a variety of uses for them, in for example U.S. Pat. Nos. 2,952,761; 2,978,665; 3,243,753; 3,351,882; 3,571,777; 3,757,086; 3,793,716; 3,823,217; 3,858,144; 3,861,029; 4,017,715; 4,072,848; 4,117,312; 4,177,446; 4,188,276; 4,237,441; 4,242,573; 4,246,468; 4,250,400; 4,255,698; 4,271,350; 4,272,471; 4,304,987; 4,309,596; 4,309,597; 4,314,230; 4,315,237; 4,317,027; 4,318,881; 4,330,704; 4,388,607; and 4,426,339. The disclosure of each of these patents is incorporated herein by reference.

The resistivity of conductive polymers usually changes with temperature at a rate well above the preferred temperature coefficient of resistivity set out above. Accordingly it is preferred that at all temperatures from 0° to 100° C., each longitudinal section of the conductive polymer jacket has a resistance which is at least 100 times, preferably at least 1000 times, the resistance of the core of that longitudinal section. In this way (since the core and the jacket are connected in parallel), the jacket does not make any substantial contribution to the resistance of the elongate conductor, and any change in its resistance with temperature is unimportant.

The source, location and return members are physically secured together (so that they follow the same elongate path), and at least one of them is spirally wrapped around an elongate insulating core at a constant pitch. Since the return member is completely insulated, the insulation of the return member can provide the insulating core, with the source and locating members being wrapped around it. Alternatively, the insulating core can be a separate member. Preferably, the source and locating members are substantially parallel to each other and are helically wrapped at a constant pitch around the insulating core, thus providing alternate turns of a double helix.

In one embodiment, the source and locating members are separated from each other by an insulating spacer which lies between them and which is separable from each of them and from the core. Such a spacer can be wrapped around the core at the same time as the source and locating members. In another embodiment, the source and locating members are separated by an insulating jacket on one or both of the members; when the sensor is to be used to detect an electrolyte, the jacket(s) must be continuously or intermittently apertured to permit the electrolyte to contact both the members. In another embodiment, the insulating core comprises depressions into which one of the conductive members is fitted. For example, the core may be cylindrical and comprise at least two channels extending along its length, with an elongate connection means positioned in each channel. Preferably, each of the channels in the cylindrical core has a depth which is greater than the diameter of the elongate connection means contained in the channel.

The helically wrapped configuration of the novel sensors results in substantial advantages, including in particular:

(a) the ability to produce, from a limited inventory of starting materials, a range of sensors of very different properties, in particular as to resolution (which depends on the impedance, per unit length of the sensor, of the locating member), and as to sensitivity (which often depends on the physical separation of the first and second connection means), by changes in easily adjusted manufacturing variables, e.g. the pitch of the wrapping, the separation of the wrapped components, and the means used to separate the wrapped components;

(b) the ability easily to incorporate into the cable additional elongate electrical means which can be used, for example, for continuity testing or ground fault detection, or so that the test circuit contains a "balancing" components, so that its sensitivity is not dependent on the distance of the leak connection from the near end, as further described below; and (c) the ability to manufacture a cable having a circular cross-section, so that it is compliant in all planes and is equally sensitive in all planes.

When the sensor is to be used to detect the presence of water or another electrolyte, it is preferred that each of the source and locating members has a continuously exposed conductive polymer surface, so that if an electrolyte is present at any point along the length of the sensor, it fills the space between the locating and source members and produces an electrical connection between the source and locating members through the electrolyte at that point.

When the sensor is to be used to detect the presence of a liquid which is not an electrolyte, e.g. a hydrocarbon, the sensor preferably includes an elongate swellable member and an elongate restraining member, e.g. a braid, which surrounds the swellable member, but through which the liquid can pass. The swellable member, in the presence of the liquid to be detected, swells and thus causes an electrical connection to be made between the source and locating members. The swellable member is preferably a hollow, tubular member which surrounds the source and locating members and contacts at most one of them in the absence of the liquid to be detected. The swellable member can itself be conductive, e.g. be composed of a conductive polymer having a resistivity (before swelling) of 1 to 250 ohm.cm, or its swelling can cause another conductive member to contact both the source and the location members. The conductive member preferably has a low modulus of elasticity, e.g. $1 \times 10^8$ to $5 \times 10^9$ dynes/cm$^2$, measured at 29° C. at a frequency of 1 radian per second, so that it is easily deformed by the swelling. It can be separated from the source and locating members by an apertured separator, through the apertures of which it is urged by the swelling. The apertured separator may for example comprise a braid of insulating filaments, or it may comprise a helically wrapped insulating member which lies between helically wrapped source and locating members and which extends outwards from the insulating core a greater distance than at least one of the source member and the location member. The separation of the conductive member from the source and/or locating member, in the unactivated sensor, is typically 0.001 to 0.05 inch, e.g. about 0.01 inch.

The swellable member is preferably composed of a polymeric material, preferably one which has been lightly crosslinked, e.g. a styrene-butadiene-styrene block copolymer, a styrene-butadiene elastomer, natural rubber isoprene rubber or nitrile rubber. The polymeric material is selected to swell in the liquid to be detected, but preferably not in any other liquid which might also be present.

Further details of the sensors of the invention are given in the description of FIGS. 1–6 below.

In the method of the invention, the presence of a liquid, preferably water or another electrolyte, causes an electrical connection to be made between the locating and source members at a first point. A current of known size is driven through the electrical connection and down the locating member to a second point at the near end of the locating member. The voltage drop between the first and second points is measured and the location of the first point can then be determined.

When the liquid causes a single or very short connection to be made between the locating and source members, then the "first point" will of course be easily identified. However, when the liquid results in connection at two or more spaced-apart locations and/or over a finite length of the locating member, the "first point", i.e. the point whose location can be determined from the observed voltage drop, is some intermediate point which can conveniently be referred to as the "electrical center" of the various connections. If there are connections at two or more spaced-apart locations, the "electrical center" may be at a location at which there is no connection between the locating and source members. It is for this reason that the connection to the locating member is sometimes referred herein as being "effective" at the first point. However, it is to be understood that where reference is made herein to the connection being "made" at the first point, this is intended to include situations in which a plurality of electrical connections are made between the locating member and the source member, with the electrical center of the connections being at the first point.

An important advantage of the method of the invention, especially when the connection is made through an electrolyte, is that the information obtained about the location of the liquid can be independent of the impedance of the connection to the locating member, i.e. the information obtained remains the same even if a substantial and unknown change is made in the impedance of the connection.

Further details of the method of the invention are given in the description of the preferred embodiments and in the description of FIGS. 7–10 below.

In a preferred embodiment of the method of the present invention,
(1) the electrical connection between the source and locating members can be made at any point along the length of the sensor,
(2) the second connection means, i.e. the locating member, has an impedance $Z_{total}$ between its near end and its far end, and
(3) the test circuit includes a "balancing" component which (i) is connected in series with that of the second connection means which lies between the first point and the second point, and (ii) has an impedance substantially equal to the difference between $Z_{total}$ and the impedance of that part of the second connection means which lies between the first point and the second point.

The use of such a balancing component solves the problem that the system is otherwise more sensitive at the near end, adjacent to the power supply, than at the far end, since the total impedance of the test circuit varies with the location of the first point. The balancing component is preferably provided by using identical first and second connection means, and by including in the sensor a fourth elongate electrical connection means which
(i) has a near end adjacent the near ends of the first, second and third connection means and a far end adjacent the far ends of the first, second and third connection means, and
(ii) is a wire which is electrically insulated from the first, second and third connection means between its near end and its far end (a) in the absence of the liquid and (b) in the presence of the liquid;

The first, second, third and fourth connection means are preferably substantially parallel to each other and are helically wrapped at a constant pitch around the insulating core. The fourth connection means, when the sensor forms part of an operating system using the method of the invention, is connected at its near end to the power source and at its far end to the far end of the source member, so that the balancing component is provided by that part of the source member which lies between the connection and the far end. Further details are given below in connection with FIG. 8.

In another preferred embodiment of the method of the invention, the system operates to locate the first point only when the connection between the source and locating members has an impedance within a predetermined range. In this embodiment,
(1) in the test circuit, the power source has an output voltage V volts and causes an electrical current I amps of known size to be transmitted between the first and second points on the second connection means; and
(2) when the value of the ratio V/I is within a predetermined range, but not when said ratio is outside said predetermined range, the location of the first point is obtained from the voltage drop between the first and second points.

This method is particularly useful when the power source is a controlled current source delivering a "fixed" current, and the connection is caused by the presence of an electrolyte. Under such circumstances, if only a very small amount of electrolyte is present, so that the locating and source members are connected to each other through a connection whose resistance is very high, false information may be provided, because the "controlled current" source cannot supply the expected current because its compliance voltage is insufficient to drive the "fixed" current in the test circuit. Under such circumstances, this embodiment can be used to prevent the delivery of information if the current falls below the "fixed" value. Further details are given below in connection with FIG. 9.

In another preferred embodiment of the method of the invention,
(1) said system includes a reference impedance which has a known impedance;
(2) the test circuit includes the reference impedance;
(3) the electrical current which is transmitted between the first and second points in the test circuit has a known relationship with the current which is transmitted through the reference impedance in the test circuit; and
(4) the current, the reference impedance and the locating member are such that, by obtaining a ratio between a first voltage drop across the reference impedance and a second voltage drop between the first and second points on the locating member, the spatial relationship between the first and second points can be determined.

A particular advantage of such modified systems is that variation in the size of the current do not have an adverse effect on the accuracy with which the location of the liquid can be calculated. As a result, the power supply need not be a constant current source, and the minor variations which occur even in a "constant" current source, do not matter. Further details are given below in connection with FIG. 10.

Reference will now be made to the Drawings.

FIG. 1 is a diagrammatic cross-section through a sensor which is suitable for detecting the presence of an electrolyte and which has been made by braiding a first connection means (comprising a metal, e.g. copper, core 1 and a conductive polymer jacket 5), a parallel second connection means (comprising a metal, e.g. "Copel", core 2 and a conductive polymer jacket 6) and ten elongate insulating members 11 around an insulating core which is provided by an insulating jacket 4 which surrounds a third connection means 3 in the form of a metal, e.g. copper, wire. It should be noted, however, that the distance between the center of the sensor and the various braided elements will not be constant as shown in the Figure, but will change as the elements interlace with each other, and that the various crossover points between the elongate elements are not shown.

FIGS. 2 to 5 illustrate sensors which are suitable for use in the detection of hydrocarbons.

FIG. 2 shows a sensor which comprises a first connection means (comprising a metal core 1 and a conductive polymer jacket 5), and a parallel second connection means (comprising a metal core 2 and a conductive polymer jacket 6) which are helically wrapped around an insulating core provided by an insulating jacket 4 which surrounds a third connection means 3 in the form of a metal, e.g. copper, wire. A braid 12 composed of polyvinylidene fluoride filaments surrounds the first and second connection means and the core, and is in turn surrounded by a tubular swellable member 14 which is composed of a styrene-isoprene-styrene block copolymer having carbon black dispersed therein and which swells when exposed to a hydrocarbon. Swellable member 14 is surrounded by a restraining member 16 composed of braided glass fibres.

FIGS. 3 and 4 show the sensor of FIG. 2 before and after swelling of member 14 respectively. As can be seen in FIG. 3, before swelling, separator braid 12 prevents electrical contact between the first and second connection means. After swelling (FIG. 4) the swollen member 14, prevented from swelling outwards by the braid 16, has penetrated through the braid 12 and thus provided a conductive bridge between the first and second connection means.

FIG. 5 shows a sensor similar to that shown in FIGS. 2 and 4 in which the swellable conductive member 14 is replaced by a hollow swellable, non conductive member 18 and a hollow non-swellable conductive member 20. The swellable member 18 surrounds the conductive member 20, and on swelling urges the conductive member 20 through the separator braid 12.

FIG. 6 shows another sensor for detecting hydrocarbons. First and second connection means as in FIG. 2 (1, 5 and 2, 6) are helically wrapped around a central elongate support core provided by the insulating jacket 4 which surrounds third connection means 3 in the form of a metal wire. Two insulating spacer wires 40, 42 are also helically wrapped around the support core, in the same sense as, and lying between, the first and second connection means. Four filler wires 44 and also helically wrapped around the support core, in the opposite sensor, so that they pass over but not under the first and second connection means, and both over and under the spacer wires 40, 42. A tubular, swellable, conductive polymer member 14 surrounds the support core and the elongate members wrapped around it. The spacer wires 40 have a larger diameter than the first and second connection means, and thus separate the first and second connection means from the tubular conductive swellable member 14. When the swellable member is exposed to a hydrocarbon, it swells, contacts and bridges the first and second connection means, forming an electrical path therebetween.

FIG. 7 is a cross-section through a part of a sensor according to the invention. An insulating cylindrical core 52 contains two channels 54 extending along its length. A first connection means (comprising a metal core 1 and a conductive polymer jacket 5) lies in one of the channels 54, and a second connection means (comprising a metal core 2 and a conductive polymer jacket 6) lies in the other channel 54. The diameter of these connection means is smaller than the depth of the channels 54.

FIG. 8 shows the electrical circuit which is present when the simplest embodiment of the method of the invention is being used to locate a liquid leak. The near end of a source member 12 is electrically connected, through a constant current source 15, to the near end 2 of a locating member 11. A return member 16 is connected at its near end, through a voltmeter 14, to the near end 2 of the locating member 11, and at its far end to the far end of the locating member 11. The presence of a liquid has caused an electrical connection E to be made between the source member 12 and a first point 1 on the locating member 11, thus forming a test circuit which includes the connection, the locating member between points 1 and 2, the constant current source 15 and part of the source member. The current supplied by the power source 15 is preferably 0.1 to 10 milliamps, e.g. 0.5 to 3 milliamps. In addition, there is a reference circuit which comprises the voltmeter 14, the locating member 11 and the return member 16.

It will be seen that the location of point 1 can be calculated if the following are known:
(a) the current flowing between points 1 and 2,
(b) the impedance of the components of the reference circuit,
(c) the voltage drop measured by the voltage-measuring device, and
(d) the impedance of the locating member between point 2 and each point on the locating member.

The accuracy with which the first point can be located is limited by the ratio of the impedance of the voltmeter to any unknown part of the impedance of the other components of the reference circuit. Preferably, therefore, the voltmeter has a resistance of at least 1 megohm, especially at least 10 megohms, and the ratio of the impedance of the voltmeter to the total impedance of the rest of the reference circuit is at least 1,000, especially at least 10,000. By contrast, the resistance of the connection between the locating and source members, and the resistance of the other components of the test circuit, do not affect the accuracy of the information obtained, provided that the power source 15 can deliver its rated constant current.

FIG. 9 is the same as FIG. 8 except that the far end of the source member 12 is connected to the power source 15 via an auxiliary member 13, so that the test circuit includes the auxiliary member 13 and that part of the source member 12 which lies between the connection and the far end instead of that part of the source member 12 which lies between the connection and the near end of the source member. In addition, the source and locating members are made from the same metal core and conductive polymer jacket. As a result, the test circuit has an impedance which is fixed except for the impedance of connection E. The sensitivity of the system is, therefore, independent of the location of the connection E. In addition, it is possible to select precisely the limits of the impedance of the connection E which will cause the system to signal that a leak has taken place, as further described below.

FIG. 10 is similar to FIG. 8 but includes also an over-range blanking unit 22 and a display unit 20, which displays the location of the connection E. The blanking unit 22 monitors the output voltage of the constant current source 15, and if the output voltage exceeds the compliance voltage (in which case the current in the test circuit will be below the expected constant current value), blanks out the display (which will be wrong, because it is calculated on the basis of the "constant" current).

FIG. 11 is similar to FIG. 8, but includes also a reference resistor 25 which is connected in series with the locating member, and a second voltmeter 26, which measures the voltage drop over the reference resistor 25. The outputs of the two voltmeters 16 and 26 are fed to a divider 27 which compares them, calculates the location of the connection and feeds the results of the calculation to a display 20. It is important that the reference impedance has a known, fixed value under the conditions of operation. Accordingly, the reference impedance preferably has a temperature coefficient of impedance which averages less then 0.003 per degree C. over the temperature range 0° to 100° C. The reference impedance preferably has resistance and no reactance. Typically values are 0.1 to 10 times, e.g. 0.5 to 2 times, the resistance of the full length of the location member. The system can include two or more reference impedances and switching means for selecting one or more of the reference impedances.

The invention is illustrate by the following Examples.

EXAMPLE 1

A circuit as shown in FIG. 6 was prepared. The controlled current source was a galvanostat with a compliance voltage of 18 volts and produced a controlled current of 0.001 amp. The voltmeter had an input impedance of 1 megohm and a full scale reading of 200 mV. The source member was a 30 AWG copper wire which was surrounded by a melt-extruded jacket of a conductive polymer composition. The jacket was about 0.04 inch thick. The conductive polymer composition has a resistivity of about 3 ohm.cm at 25° C. and comprised carbon black (about 45 part by weight) dispersed in a thermoplastic rubber which is sold under the trade name TPR-5490 and which is believed to be a blend of polypropylene and an ethylene/propylene rubber (about 55 parts by weight). The locating member was the same as the source member except that a 30 AWG Constantan wire was used instead of the copper wire. The resistance of the locating conductor was 2.940 ohms/foot. The return member was a 12 AWG copper wire and it was surrounded by a polymeric insulating jacket.

In a number of tests, a damp sponge was placed on the locating and source members to effect electrical connection between them, the members being dried between the tests. It was found that, as expected from theory, the distance (d) in feet to the damp sponge could be calculated from the equation $$d = \frac{V}{0.001 \times 2.94}$$

where V is the voltage (in volts) recorded by the voltmeter. The discrepancy between the actual and calculated values of d was less than 0.1%.

EXAMPLE 2

Two conductive members, the first comprising a copper core surrounded by a conductive polymer jacket and the second comprising a "Copel" core surrounded by a conductive polymer jacket, together with insulating members, were formed into a braid around an insulating jacket surrounding a third copper stranded wire. An insulating jacket comprising polyvinylidene-fluoride fibres was then braided thereover.

A swellable conductive polymer composition was compounded using a Banbury mixer. The composition had the following composition:

| | |
|---|---|
| Kraton 1107 | 58.0 weight % |
| Conductex 975 | 35.0 |
| Shellflex 371 | 5.0 |
| TAIC | 1.0 |
| Irganox 1010 | 0.5 |
| Agerite Resin D | 0.5 |
| | 100.0 |

| | |
|---|---|
| Kraton 1107 | is a styrene-isoprene-styrene block copolymer manufactured by Shell Chem. Co. with a styrene/rubber ratio of 28/72. |
| Conductex 975 | is a high surface area carbon black with high electrical conductivity manufactured by Cities Service Company, Columbian Division. |
| Shellflex 371 | is a naphthenic oil manufactured by Shell Oil and is used as a processing aid. |
| TAIC | is triallylisocyanurate, which is a radiation crosslinking agent. |
| Irganox 1010 Agerite Resin D | are antioxidants/antidegradants/heat stabilizers |

The swellable conductive composition was extruded over the braid-enclosed cables. The extrudate had a wall thickness in the range 50 to 60 mils, an external diameter of 0.25 inch and an internal diameter of 0.19 inch. The extruded material was beamed with a beam of high energy electrons to a dose of 10 Mrads throughout. Finally the swellable material was overbraided with a restraining braid comprising glass fibre, Fibreglass ECG 105-3/4, as supplied by Owens Corning.

The sensor was then connected into a circuit according to FIG. 7, the "Copel" wire providing the locating member, the copper wire the source member, and the central copper wire the return member. The sensor was immersed in turn in a number of different liquids and the resistance in the test circuit (including the locating and source wires and any connection between them) was monitored. The time (in minutes) for the resistance to fall to 20,000 ohm and further to 1,000 ohm is shown below. Two tests were carried out for each solvent.

| LIQUID | TIME to 20,000 ohms | TIME to 1,000 ohms |
|---|---|---|
| JP-7 (Jet Fuel) | 8 | 11¼ |
| " | 11 | 16 |
| Xylene | 3½ | 5½ |
| " | 2 | 4 |
| Methylethylketone | 7 | 15 |
| " | 8 | 19 |
| Methylene Chloride | 1 | 4½ |
| " | <½ | 1 |
| Acetone | 61 | 114 |
| " | 105 | 152 |
| Trichlorethylene | 1¼ | 3 |
| " | <1 | <2 |
| Carbon Disulfide | ½ | 1½ |
| " | <½ | ½ |

EXAMPLE 3

Two devices as shown in FIG. 6 were made. These are referred to as Devices A and B. The sizes of each of the components on devices A and B were as follows:

| | Device A in Inch | Device B in Inch |
|---|---|---|
| Diameter of Support Core (4) | 0.077 | 0.060 |
| Diameter of Spacer Wires (40, 42) | 0.035 | 0.049 |
| Diameter of Conductive Polymer Jackets (5, 6) | 0.032 | 0.032 |
| Diameter of Filler Wires (44) | 0.013 | 0.013 |

| | Device A in Inch | Device B in Inch |
|---|---|---|
| Wall Thickness of Swellable Member (14) | 0.050 | 0.050 |

Both devices were exposed to solvent to make the swellable member swell and the time for the resistance fall to 20,000 ohm was recorded, as in Example 2. The physical load required to effect the same resistance decrease, in the absence of solvent, was also measured. It is referred to as the load to trigger. The load to trigger was measured by compressing the devices using an Instron machine having a crosshead displacement rate of 0.05 inch per minute. The anvil used to compress the samples had a diameter of 2.25 inches. The load to trigger was calculated per unit length of the device. Two readings were taken in each test. The results are shown below.

| | Device A | Device B |
|---|---|---|
| Time in minutes to reduce resistance to 20,000 ohm by solvent | 5.0 | 31.5 |
| | 5.0 | 34.0 |
| Load to trigger in lbs. per linear inch | 12.5 | 50.2 |
| | 15.4 | 43.5 |

For device A (where the spacer wires project at least 3 mils further than the first and second connection means) the response time is more rapid, but the load to trigger lower, than for device B (where the spacer wires project at least 17 mils further than the first and second connection means). Device A is particularly suited to applications where a rapid response time is required. Device B is particularly suited to applications where the device may be subject to external pressure, and accidental response needs to be avoided.

The load to trigger of device A was increased to over 30 pounds per linear inch by helically wrapping a resilient coil around the device.

For further details of the way in which the novel sensors of this invention can be constructed and used, reference may be made to the parent U.S. Pat. No. 5,015,958, the disclosure of which is incorporated herein for all purposes.

We claim:

1. An elongate sensor for use in a method for detecting and locating the presence of a liquid, the sensor comprising
   (1) a first elongate electrical connection means
      (i) which has a near end and a far end; and
      (ii) which comprises an elongate metal core electrically surrounded by a jacket of a conductive polymer composition which comprises a polymeric component and, dispersed in the polymeric component, a sufficient amount of a particulate conductive filler to render the composition conductive at ambient temperature;
   (2) a second elongate electrical connection means
      (i) which has a near end adjacent the near end of the first connection means and a far end adjacent the far end of the first connection means,
      (ii) which comprises an elongate metal core electrically surrounded by a jacket of a conductive polymer composition which comprises a polymeric component and, dispersed in the polymeric component, a sufficient amount of a particulate conductive filler to render the composition conductive at ambient temperature;
      (iii) whose resistance, from the near end to each point thereon, is characteristic of its length from the near end to that point, and
      (iv) which is electrically insulated from the first connection means between its near end and its far end in the absence of the liquid and which, in the presence of the liquid, becomes electrically connected to the first connection means, the connection being effective at a first point whose location is defined by the location of the point or points at which the liquid is present;
   (3) a third elongate electrical connection means
      (i) which has a near end adjacent the near ends of the first and second connection means and a far end adjacent the far ends of the first and second connection means, and
      (ii) which is an insulated wire which is electrically insulated from said first and second electrical connection means between its near end and its far end in the absence of the fluid and in the presence of the fluid; and
   (4) an elongate insulating core;
the first, second and third connection means being physically secured together; and at least one of the first, second and third connection means being spirally wrapped around the core at a constant pitch.

2. A sensor according to claim 1 which is suitable for use in a method for detecting and locating the presence of a liquid electrolyte and in which each of the first and second connection means comprises a continuously exposed conductive polymer surface so that the presence of an electrolyte at any point along the length of the sensor results in electrical connection between the first and second connection means through the electrolyte at that point.

3. A sensor according to claim 2, wherein the first and second connection means are substantially parallel to each other and are helically wrapped at a constant pitch around the insulating core, the first and second connection means thus providing alternate turns of a double helix.

4. A sensor according to claim 3 which includes a fourth elongate electrical connection means which
   (i) has a near end adjacent the near ends of the first, second and third connection means and a far end adjacent the far ends of the first, second and third connection means, and
   (ii) is a wire which is electrically insulated from the first, second and third connection means between its near end and its far end (a) in the absence of the electrolyte and (b) in the presence of the electrolyte;
and wherein the first, second, third and fourth connection means are substantially parallel to each other rand are helically wrapped at a constant pitch around the insulating core.

5. A sensor according to claim 1 which is suitable for use in a method for detecting and locating the presence of a liquid hydrocarbon and which comprises an elongate swellable member and an elongate restraining member which surrounds the swellable member, the swellable member, in the presence of a liquid hydrocarbon, swelling and thus causing an electrical connection to be made between the first and second electrical connection means.

6. A sensor according to claim 5 wherein the first and second connection means are substantially parallel to each other and are helically wrapped at a constant pitch around the insulating core, the first and second connection means thus providing alternate turns of a double helix.

7. A sensor according to claim 6 which includes an elongate insulating spacer member which is helically wrapped around the core between the first and second connection means and which at all points projects outwardly from the core a greater distance than at least one of the first and second connection means.

8. A sensor according to claims 1, 2, 3, 4, 5, 6 or 7 wherein the insulating core is cylindrical and comprises at least two channels extending along its length, the first connection means being positioned in one of the channels and the second connection means being positioned in another of the channels, and the depth of each of said channels being greater than the diameter of the connection means contained therein.

9. A method for detecting and locating the presence of an electrolyte, which method comprises
(A) providing a system
  (a) which comprises
    a power source;
    a voltage-measuring device; and
    an elongate sensor for detecting sand locating the presence of an electrolyte, the sensor comprising
    (1) a first elongate electrical connection means
      (i) which has a near end and a far end; and
      (ii) which comprises an elongate metal core electrically surrounded by a jacket of a conductive polymer composition which comprises a polymeric component and, dispersed in the polymeric component, a sufficient amount of a particulate conductive filler to render the composition conductive at ambient temperature;
    (2) a second elongate electrical connection means
      (i) which has a near end adjacent the near end of the first connection means and a far end adjacent the far end of the first connection means,
      (ii) which comprises an elongate metal core electrically surrounded by a jacket of a conductive polymer composition which comprises a polymeric component and, dispersed in the polymeric component, a sufficient amount of a particulate conductive filler to render the composition conductive at ambient temperature;
      (iii) whose resistance, from the near end to each point thereon, is characteristic of its length from the near end to that point, and
      (iv) which is electrically insulated from the first connection means between its near end and its far end in the absence of the electrolyte and which, in the presence of the electrolyte, becomes electrically connected to the first connection means, the connection being effective at a first point whose location is defined by the location of the point or points at which the electrolyte is present;
    (3) a third elongate electrical connection means
      (i) which has a near end adjacent the near ends of the first and second connection means and a far end adjacent the far ends of the first and second connection means, and
      (ii) which is an insulated wire electrically insulated from said first and second electrical connection means between its near end and its far end in the absence of the electrolyte and in the presence of the electrolyte; and
    (4) an elongate insulating core;
    the first, second and third connection means being physically secured together, and at least one of the first, second and third connection means being spirally wrapped around the insulating core at a constant pitch; and
  (b) in which system, when an electrolyte is present,
    electrical connection is made between the first connection means and the second connection means through said conductive polymer composition;
    the connection to the second connection means being effective at a first point whose location is defined by the location of the point or points at which the liquid is present;
    the making of the connection resulting in the formation of a test circuit which comprises (i) that part of the second connection means which lies between the first point and a second point at the near end of the second connection means, (ii) the connection, and (iii) the power source, the power source causing an electrical current of known size to be transmitted between the first and second points on the second connection means; and
    the current and the second connection means being such that, by measuring the voltage drop between the first and second points, the spatial relationship between the first and second points can be determined;
(B) monitoring the system continuously or on a schedule to determine when a said connection has been made, said test circuit being in existence while said monitoring is taking place if a said connection has been made;
(C) when it is determined that a said connection has been made, using the voltage-measuring device to determine the voltage drop between the first and second points; and
(D) obtaining the location of the first point from the measurement made in step (C).

10. A method according to claim 9 wherein
(1) said electrical connection between the first and second connection means can be made at any point along the length of the sensor,
(2) the second connection means has an impedance $Z_{total}$ between its near end and its far end, and
(3) the test circuit includes a component which (i) is connected in series with that part of the second connecting means which lies between the first point and the second point, and (ii) has an impedance substantially equal to the difference between $Z_{total}$ and the impedance of that part of the second connection means which lies between the first point and the second point.

11. A method according to claim 9 wherein
(1) in the test circuit, the power source has an output voltage V volts and causes an electrical current I amps of known size to be transmitted between the first and second points on the second connection means; and (2) when the value of the ratio V/I is within a predetermined range, but not when said ratio is outside said predetermined range, the location of the first point is obtained from the voltage drop between the first and second points.

12. A method according to claims 9, 10 or 11 wherein
(1) said system includes a reference impedance which has a known impedance;
(2) the test circuit includes the reference impedance;
(3) the electrical current which is transmitted between the first and second points in the test circuit has a known relationship with the current which is transmitted through the reference impedance in the test circuit; and
(4) the current, the reference impedance and the locating member are such that, by obtaining a ratio between a first voltage drop across the reference impedance and a second voltage drop between the first and second points on the locating member, the spatial relationship between the first and second points can be determined.

* * * * *